Oct. 12, 1937.  C. W. NEILSEN  2,095,278
AMALGAM TRAP
Filed July 7, 1936  2 Sheets-Sheet 1

INVENTOR
C. W. Neilsen
BY
ATTORNEY

Oct. 12, 1937.  C. W. NEILSEN  2,095,278
AMALGAM TRAP
Filed July 7, 1936   2 Sheets-Sheet 2

INVENTOR
*C. W. Neilsen*
BY
ATTORNEY

Patented Oct. 12, 1937

2,095,278

UNITED STATES PATENT OFFICE 2,095,278

AMALGAM TRAP

Charles W. Neilsen, San Andreas, Calif.

Application July 7, 1936, Serial No. 89,276

5 Claims. (Cl. 209—202)

This invention relates generally to mining equipment and in particular relates to an amalgam trap for the recovery of gold and other precious metals.

In the gold mining industry one of its greatest problems is the recovery of the exceedingly small particles of the gold known as "fines" which have a tendency to remain suspended in the wash water and thereby escape the mercury in the usual sluice boxes.

It is therefore the principal object of my invention to provide an amalgam trap which will effectively and rapidly recover a substantial portion of the "fines" prior to the discharge of the main portion of the gold bearing material onto the sluice box.

Another object of my invention is to provide an amalgam trap having a large capacity without affecting the recovery of "fines" and one which will not readily clog up.

It is also my object to provide an amalgam trap which is enclosed and may be locked against unauthorized removal of the amalgam therefrom.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
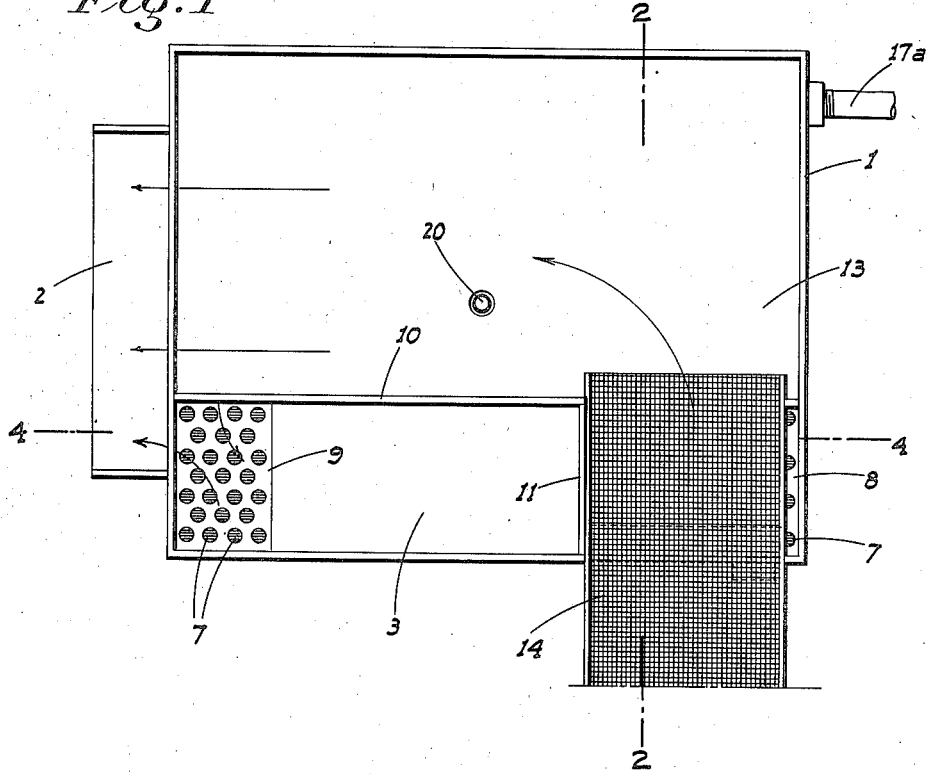
Figure 1 is a top plan view of the device with the cover plate removed.
Figure 2:
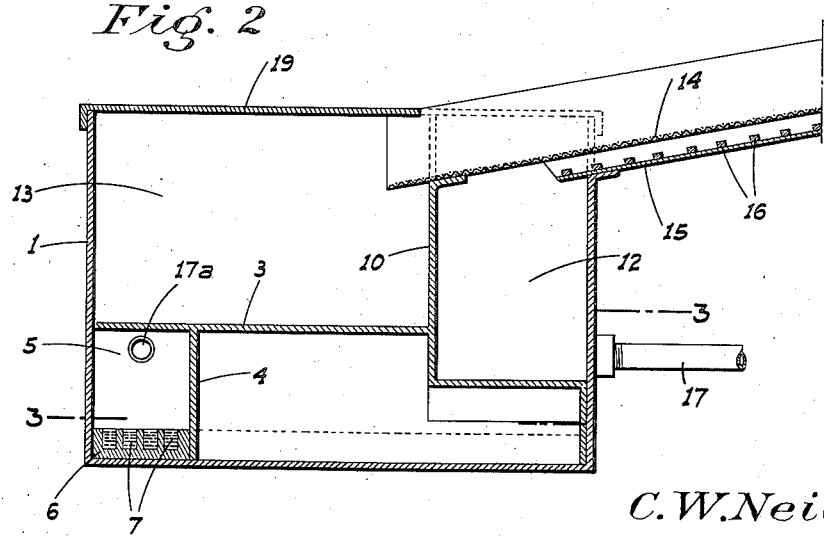
Figure 2 is a sectional elevation on line 2—2 of Fig. 1.
Figure 3:
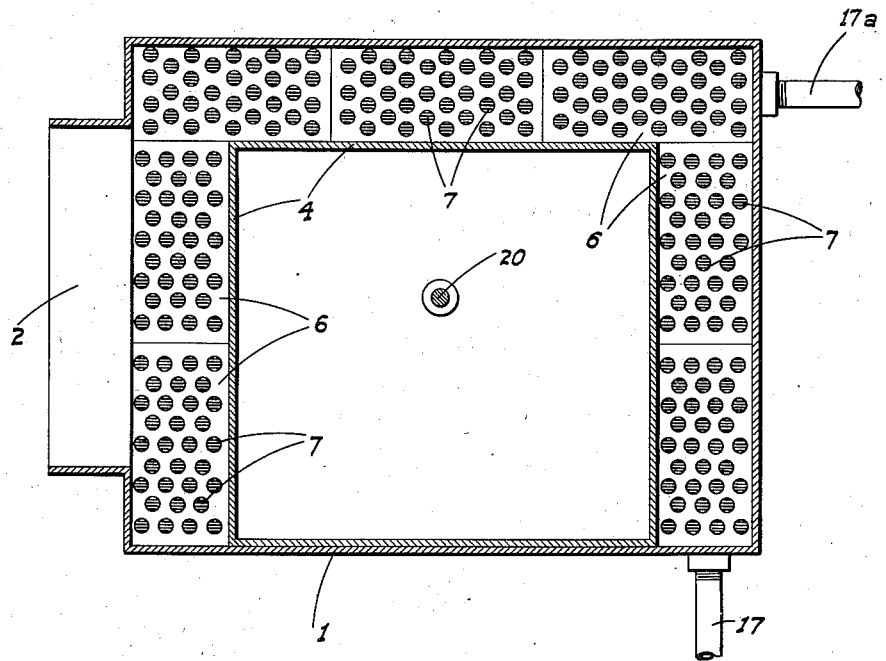
Figure 3 is a sectional plan view on line 3—3 of Fig. 2.
Figure 4:
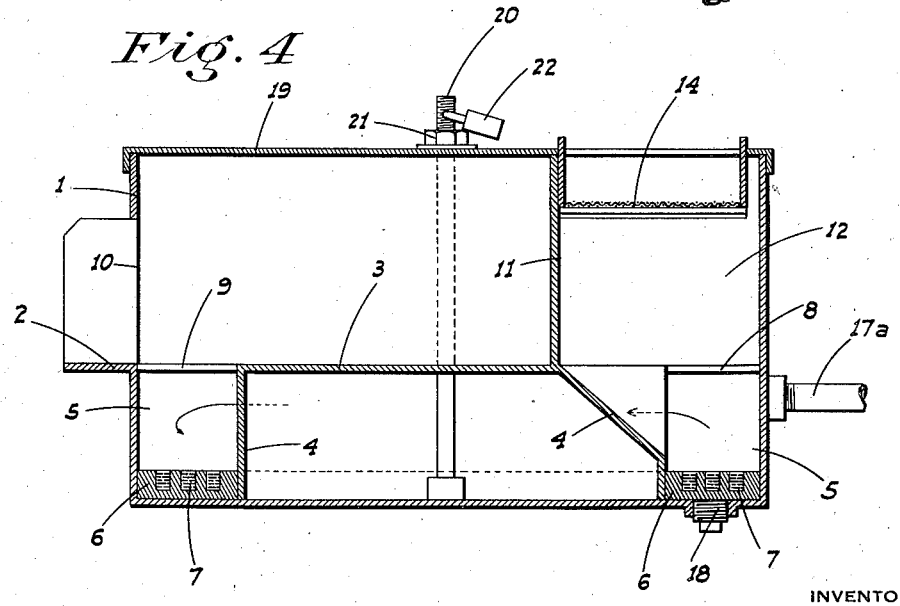
Figure 4 is a sectional elevation on line 4—4 of Fig. 1.

Referring now more particularly to the characters of reference on the drawings, the numeral 1 indicates a rectangular case or tank open at its top and formed at one end with a relatively wide spillway 2 disposed some distance from the bottom of the tank as shown.

A false floor 3 is disposed horizontally in the tank above the bottom thereof and on a level with the spillway 2. A skirt 4, rectangular in shape, depends from the false floor 3 to the bottom of the tank and, as shown, is spaced from three sides of the tank and engages in face to face relation with the other side. The skirt thus forms in combination with the false floor and walls of the tank an enclosed passage 5 which extends about three sides of said tank.

A series of rectangular blocks 6 are removably disposed in the passage 5 and rest on the bottom of the tank. Each of the blocks is formed with a plurality of mercury sumps or pockets 7.

The floor 3 at the end opposite the spillway has a rectangular portion 8 cut out of one corner thereof in order to afford an intake into one end of passage 5 formed beneath the floor. Another rectangular opening 9 is cut through the floor on the same side as opening 8 but at the corner adjacent the spillway and above the other end of passage 5.

An upstanding wall 10 is secured to the floor and extends from side to side of the tank adjacent the openings 8 and 9. Another wall 11 extends from the wall 10 to the side of the tank and forms with a portion of wall 10 a chute, shown at 12, leading from the top of the tank into opening 8. The wall 10 also serves to form an enlarged trough 13 in the tank and which trough discharges through the major portion of the spillway as will hereinafter appear.

A sloping trough 14, having a foraminous bottom, extends across the chute 12 and is arranged to discharge into enlarged trough 13. Another trough 15 having a solid bottom and provided with riffles 16, is disposed immediately beneath trough 13 and extends only to a point above the chute 12 to discharge into the same.

A pipe 17 enters the tank below opening 8 and is adapted to discharge a stream of water under pressure along passage 5 over the blocks 6. A removable plug 18 is mounted in the bottom of the tank and is used to drain the passage 5 when desired. A removable cover 19 closes the top of the tank and is secured in place by a vertical rod 20 projecting upwardly from the tank bottom through the false floor and cover, and provided with a nut 21 threaded on its upper end. A padlock 22 prevents unauthorized removal of the cover.

The floor 3, skirt 4, and walls 10 and 11 are formed as an integral unit and are removable as such from the tank.

Operation

In use, my amalgam trap operates as follows.

The pockets 7 in blocks 6 are first partially filled with mercury and some mercury is also deposited in riffles 16 in trough 15. The gold bearing material, along with a quantity of water, is then discharged as a continuous stream onto the upper end of trough 14; the larger pieces of material including larger pieces of gold being discharged into the enlarged trough 13 formed in the tank. From the enlarged trough 13, the material flows from spillway 2 onto a sluice box of the usual character (not shown). The larger particles of gold are thus recovered in the sluice box. It is the recovery of the "fines" however which my device is especially adapted to accomplish.

As the material passes over trough 13, the finer material, including the minute particles of gold drop through the foraminous bottom and onto trough 15 where some of the "fines" are picked up in riffles 16. The material, still bearing a great proportion of the "fines", discharges from trough 15 through opening 8 onto the blocks 6 at the beginning of passage 5.

From this point the material is forced, under the pressure of the water from pipe 17, about the entire passage and in a state of turbulent agitation. As this agitation occurs, the fine particles of gold are amalgamated with the mercury in the pockets 7 in blocks 6. Due to the fact that passage 5 is enclosed, material cannot pile up or clog as the water from pipe 17 keeps the material moving along.

By the time the material has traversed the entire length of passage 5 and has been continuously in motion, substantially all of the fine gold has contacted the mercury in pockets 7 and has been amalgamated.

At the end of passage 5, the water rises through opening 9 in floor 3 and discharges out of the adjacent portion of spillway 2. Wall 10, of course, separates the overflow from passage 5 and that from enlarged trough 13. Due to the fact that the water must rise to escape from passage 5, the tendency is for the heavy gold to fall back and be amalgamated while all other material is carried along with the water and discharged into the sluice box (not shown).

To remove the amalgam from my trap, the cover 19 is removed, the floor and attached elements removed as a unit and the blocks then removed and the amalgam emptied out of pockets 7. Plug 18 may be removed in order to draw off excess water.

As the passage 5 is circuitous, the flow of water about the corners causes eddying which adds to the agitation or turbulence of the material in the water. This feature of construction also makes it possible to construct the trap as a compact unit.

If desired, another injection pipe 17a may be mounted on the tank to discharge water lengthwise into passage 5 at a point intermediate its ends in order to increase the agitation of the gold bearing material in said passage.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. An amalgam trap comprising a rectangular tank, means in the tank forming an enclosed passage, amalgam retaining elements disposed in the bottom of the passage, means to feed gold bearing material into one end of the passage, a pipe arranged to discharge a stream of water into said end of the passage, and overflow means formed in connection with the tank and arranged to permit escape of the water from the other end of the passage at a level adjacent the top of said passage; said first named means comprising a false floor removably disposed in the tank and a rectangular skirt extending between the floor and the bottom of the tank and spaced from the walls of the tank on three sides thereof to form corresponding sides of the passage.

2. An amalgam trap comprising a tank, a false floor in said tank, a skirt extending from the false floor to the bottom of the tank and forming an enclosed passage, amalgam retaining elements in the bottom of said passage, means to inject water into one end of the passage, means to feed larger gold bearing material onto the false floor, means to feed small gold bearing material into the passage at said one end, and a spillway formed in the tank and arranged to serve as an escape for material from the false floor as well as from the other end of the passage.

3. An amalgam trap comprising a rectangular tank, a removable false floor disposed in the tank, a rectangular skirt depending from the floor and spaced from the walls of the tank on three sides thereof whereby to form an amalgamating passage, means to retain a supply of amalgam in the bottom of the passage, means to feed gold bearing material into one end of the passage, a pipe arranged to discharge water into said one end of the passage, and overflow means formed in connection with the tank and arranged to permit escape of water from the other end of the passage at a point above the bottom thereof.

4. A device as in claim 2 in which said feeding means comprises an open ended chute mounted in the tank and in communication at its lower end with said one end of the passage, a sloping trough having a non-foraminous bottom arranged to discharge into the chute, and another sloping trough having a foraminous bottom superposed in spaced relation to the first named trough and arranged to discharge at its lower end onto the false floor.

5. A device as in claim 2 in which the spillway comprises a discharge opening formed in one side of the tank at substantially the floor level, the floor having an opening into the said other end of the passage and at a point adjacent the discharge opening in the side of the tank, and a partition upstanding from the floor and arranged to maintain the material on the floor from entry into said opening in the floor and which opening is in communication with said other end of the passage.

CHARLES W. NEILSEN.